United States Patent

[11] 3,549,101

| [72] | Inventors | Otto W. Krause<br>Heinrichstrasse 5-6,<br>Berlin 45, Germany |
|---|---|---|
| [21] | Appl. No. | 767,661 |
| [22] | Filed | Oct. 15, 1968 |
| [45] | Patented | Dec. 22, 1970 |
| [32] | Priority | Oct. 17, 1967 |
| [33] | | Germany |
| [31] | | No. 1,597,699 |

[54] SPOOLS FOR PHOTOGRAPHIC FILMS
16 Claims, 7 Drawing Figs.

| [52] | U.S. Cl. | 242/76 |
|---|---|---|
| [51] | Int. Cl. | B65h 27/00, |
| [50] | Field of Search | 242/77.1, 76 |

[56] References Cited
UNITED STATES PATENTS

| 2,243,453 | 5/1941 | Busse | 242/77.1 |
|---|---|---|---|
| 2,280,113 | 4/1942 | Andrews | 242/76X |
| 3,062,469 | 11/1962 | Smith | 242/77.1 |

FOREIGN PATENTS

| 645,568 | 11/1950 | Great Britain | 242/76 |
|---|---|---|---|

*Primary Examiner*—Nathan L. Mintz
*Attorneys*—Smythe and Moore

ABSTRACT: A spool for carrying film comprises two spirally grooved discs mounted on a spindle, a retaining flap for holding the end of the film on the spindle, and a detachable device for guiding the film onto the spindle. The detachable device includes a lead-in channel for guiding the film beneath the flap for securing it to the spindle. The spool can be used for reeling two films back to back.

PATENTED DEC 22 1970

Inventor:
OTTO W. KRAUSE

BY
Smythe & Moore
ATTORNEYS

SPOOLS FOR PHOTOGRAPHIC FILMS

BACKGROUND OF THE INVENTION

The invention relates to spools for photographic films and especially to spools of the type comprising at least two spirally grooved discs mounted on a spindle, at least one retaining mechanism for securing the ends of the strips of film to the spindle and an ancillary device for introducing the strips of film into the grooves on the spirally grooved discs.

Spools of the above kind are known wherein the end of a single film, prior to its being introduced into the spool, must be pushed under a spring fitted on the spindle of the spool, this spring securing the end of the film in a positive manner. The device for introducing the film is here in the form of a guide element, which is held by hand on the circumferential surfaces of the spirally grooved discs and which merely serves to impart to the film the curvature necessary for its introduction between the spirally grooved discs (Federal German Pat. No. 1,034,480). Such an arrangement is not completely satisfactory because it is difficult to secure the end of the film to the spindle of the spool. When the film is introduced beneath the retaining spring, it is necessary to overcome the spring-force which is subsequently to be used for securing the film and which therefore should not be too small. The guide element makes no contribution towards reducing the difficulties indicated.

A device for winding on a film is also known wherein the end of the film, prior to the actual on-winding operation, is secured to the spring clip of a tension member, which clip engages the middle of the strip of film (Federal German Utility Model 1,838,592). In this device, too, the ancillary device, formed as a guide channel, merely performs the function of facilitating introduction of the strip of film into the grooves of the spirally grooved discs, but not that of securing the end of the film to the retaining mechanism.

The difficulties that arise with the known spools when securing the film to the spindle of the spool are particularly troublesome, not least, since, particularly when developing color films, the work must be carried out in completely dark rooms and maximum simplicity in handling is a basic prerequisite for satisfactory work.

The object of the invention is to meet this requirement and to provide a developing spool whereby not only one film, but also two films lying back to back, can be more conveniently and more reliably connected to the spool and introduced into the correlated spiral tracks than has been possible heretofore.

SUMMARY OF INVENTION

According to the invention, the above object is achieved in a spool of the type described by providing the retaining mechanism with a flap which is resiliently lockable in an open or closed position and which forms, in the open position a wedge-shaped gap for introducing the ends of the films and in the vicinity of which flap there terminates a lead-in channel of the ancillary device, which channel guides the film beneath the flap and can be locked on to the spool.

The spool of the invention offers the advantage that the film can be connected to the spool in complete darkness in the simplest manner. The guide channel guides the film directly into the open flap, which serves as a stop and lays the end of the film parallel with the spindle of the spool, thus ensuring that a side of the film is not introduced into a spiral groove that does not belong to the spiral groove in which the other side of the film comes to rest. The automatic introduction of the end of the film into the wedge formed by the flap has a particularly advantageous effect when developing two films laid back to back, since the ends of these films tend to roll up in opposite directions of rotation. This tendency is firstly counteracted by the guide channel and then by the flap directly adjacent thereto.

To achieve particularly reliable anchoring of the film or films, the spool may be provided with at least one retaining pip for anchoring the film on to the spindle of the spool and the pip can be depressed into a recess through the film by means of the flap.

A further important feature of the invention resides in the fact that the lead-in channel bears, by its end remote from the flap, against a bracket that can be fitted on to the spool, the bracket preferably taking the form of a bellcrank lever or the like that can be fitted on to the spindle of the spool and is rotatably mounted at that position. The spool, the lead-in channel and the bracket offer the advantage that, on the one hand, they form a closed, easily handled unit during introduction of the film and, on the other hand, can be readily taken apart before the filled spool is put into a developer container.

As mentioned above, the spool of the invention because of its retaining and lead-in mechanism, enables two films, coated on one side, to be developed simultaneously. In order to prevent contact between opposed coatings in consecutive spiral tracks during the developing process, in accordance with a further proposal of the invention, guide elements project into the spiral grooves and these hold the strips of film, introduced into the spool, at a distance from one wall of the spiral grooves. In this way and without the use of additional ancillary means such as end-stops (Federal German Pat. No. 1,016,124), opposed coated surfaces of a film are prevented from coming into contact after the strip of film has been wound into the spool and the developer solution is thus prevented from reaching the coating on the film. Rather, the strip of film is held against one and the same side of each spiral track by the guide elements.

In order that the invention may be more clearly understood, an embodiment thereof will now be described by way of example, reference being made to the accompanying drawing in which:

BRIEF DESCRIPTION OF THE DRAWINGS

Mounted on the spindle 13 is a pip 18 on which the film, introduced into the spool, can be anchored with the help of a flap 19 which is mounted to swing on the spirally grooved discs 11 and 12 and which contains an orifice 20 which the pip 18 enters when the flap 19 is closed. The flap 19 can assume an open and a closed position and is held in each of these positions in a resilient manner. In FIGS. 1 and 2, the flap 19 is illustrated in the open position. Here, it forms a wedge-shaped gap for introducing the ends of the film, this gap extending over the entire width of the spindle 13 and facilitating introduction of the films in the correct position. For locking the flap in the open or closed position, use is made of a domed projection 21, which projects into the path along which the outer edge of the flap 19 moves and which is mounted on a free end of a radial web 14, which end functions as a resilient tongue. Considering the example of FIG. 2, the flap 19 can occupy two stationary positions, namely one to the left and one to the right of the projection 21. The flap is prevented from opening too far by its edge, in the open position, abutting against the inner wall of the first spiral groove 16.

Figure 1:
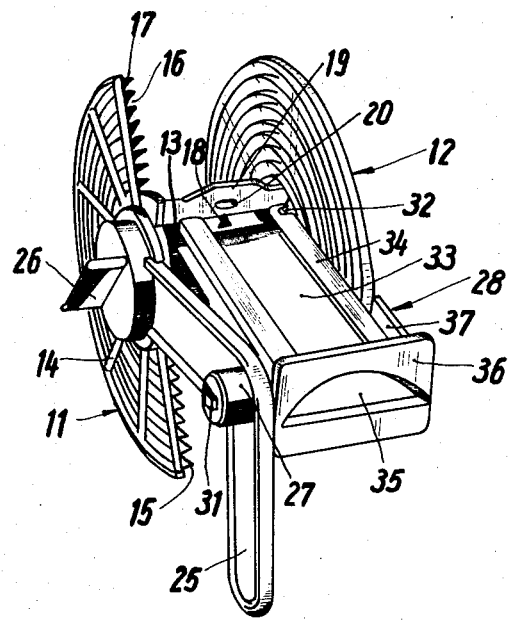
FIG. 1 is a perspective view of a developing spool of the invention, together with the lead-in channel and bracket, part of the left-hand spirally grooved discs being omitted.

A bore 23 in the spindle 13 accommodates the shaft-stub 24 of a bracket 25, in the form of a bellcrank lever, detachably connected to the spindle, which bracket can be held by a handle 26 when films are wound on to the spool by rotating the latter.

At that end of the bracket 25 remote from the shaft-stub 24, the bracket is provided with a bearing 27 for a pivot on a lead-in channel 28. This bearing has an annular flange 29 which is interrupted at one point and forms a slot 30 into which an L-shaped projection 31 on the pivot of the lead-in channel can be inserted and locked when turned.

In its working position, the lead-in channel 28 is held by a locking element 32 which is mounted on the spirally grooved disc 12 and engages in a recess in one of the freely projecting upper guide lugs 34 which can be resiliently pressed against the bottom 33 of the lead-in channel 28. In FIG. 1, the spool, the bracket and the lead-in channel are interconnected in such a manner that they form a single unit. The semicircular inlet orifice 35 in the lead-in channel 28 is defined by a payout plate 36. The plate 37 is for supporting the lead-in channel on the outer edge of the spirally grooved disc 12.

Figure 2:
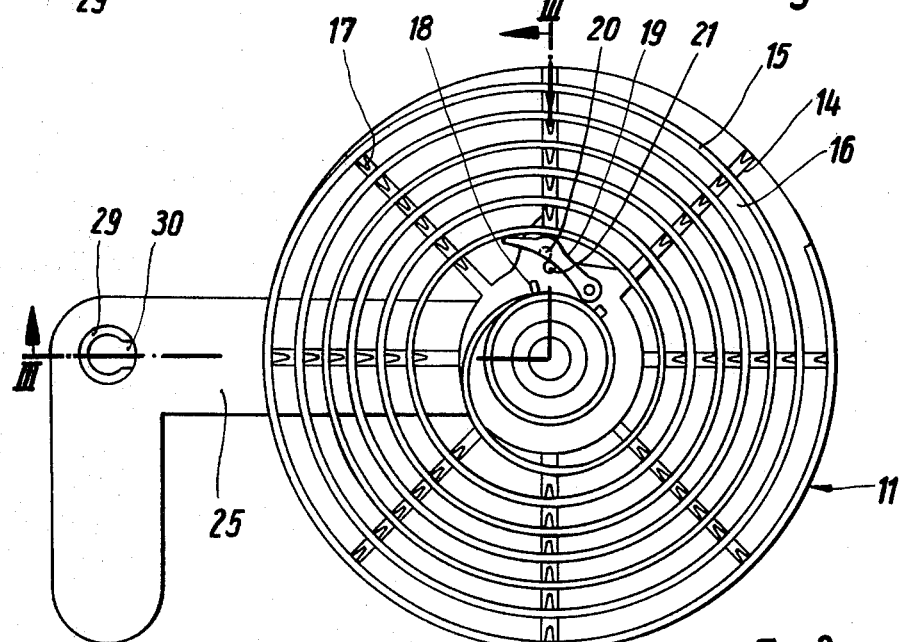
FIG. 2 is a view, from the interior, of a spirally grooved disc of the spool shown in FIG. 1.

When a film, or two films laid back to back are introduced into the lead-in channel 28, the ends of the film are each advanced until they encounter the flap 19 and are guided by the latter parallel with the spindle 13. The moment at which the ends of the film meet the flap is readily sensed by the user of the spool from the increased resistance which prevents further insertion of the film. As soon as the film is introduced into the gap formed by the flap 19 and the spindle 13, the flap is moved from the open position, illustrated in FIGS. 1 and 2, into the closed position. The pip 18 hereby penetrates the film and enters the orifice 20. The film is then firmly anchored to the spool. Then, by depressing the right-hand guide lug 34, the locking element 32 is released and the spool is filled by being rotated.

Figure 4:
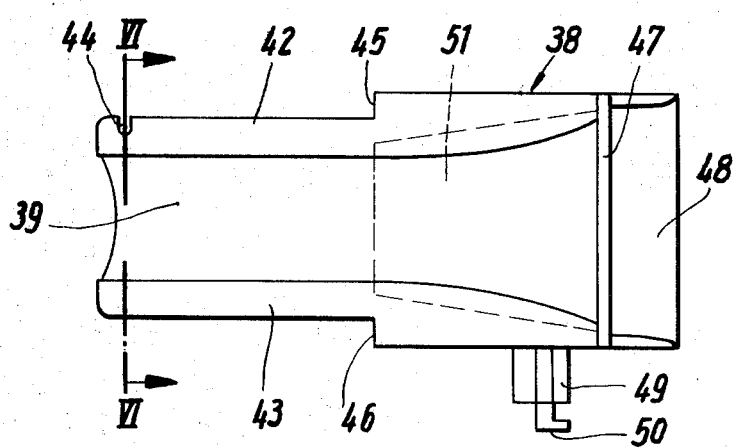
FIG. 4 is a plan view of a lead-in channel for wider films.
Figure 5:
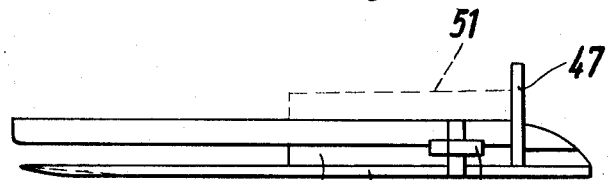
FIG. 5 is a side view of the lead-in channel seen in FIG. 4.
Figure 6:
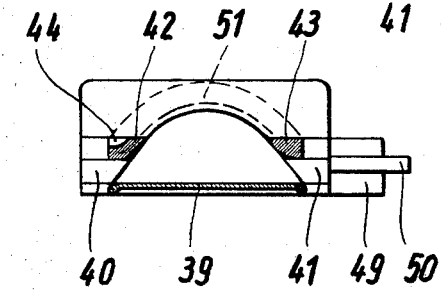
FIG. 6 is a section on the line VI–VI of FIG. 4.

A lead-in channel 38 of slightly modified form is illustrated in FIGS. 4 to 6. It consists of a base portion 39 and upper guide ribs 42 and 43 connected therewith by way of lateral portions 40 and 41, one of these guide ribs being provided with an orifice 44 for the locking element 32 illustrated in FIG. 1. Projections 45 and 46 are for supporting the lead-in passage on the outer edges of the spirally grooved discs. Whereas, in the case of the previously described lead-in channel, the inlet opening is limited by a plate extending upwardly and downwardly beyond the channel, in the second form of construction, the base of the channel projects beyond a plate 47, which only extends upwards, and said base thus forms a guide lip 48. This construction facilitates the introduction of wider rolls of film as well.

A pivot 49 with an L-shaped projection 50 serves to connect the lead-in channel 38 to a suitable bracket 25.

The developing spool of the invention can be modified in numerous ways. Thus, the broken lines in FIGS. 4—6 show that the lead-in channel for the film is covered at its inlet end by a dished bridge member 51 and so forms a guide tunnel. A construction of this kind offers advantages as regards wide films and films having thin carriers for the coatings, which films call for particularly careful guiding when wound into the spool.

Figure 3:
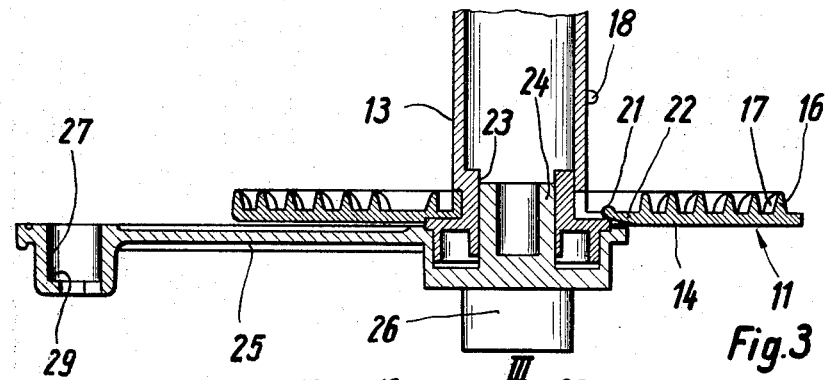
FIG. 3 is a section on the line III–III of FIG. 2.
Figure 7:
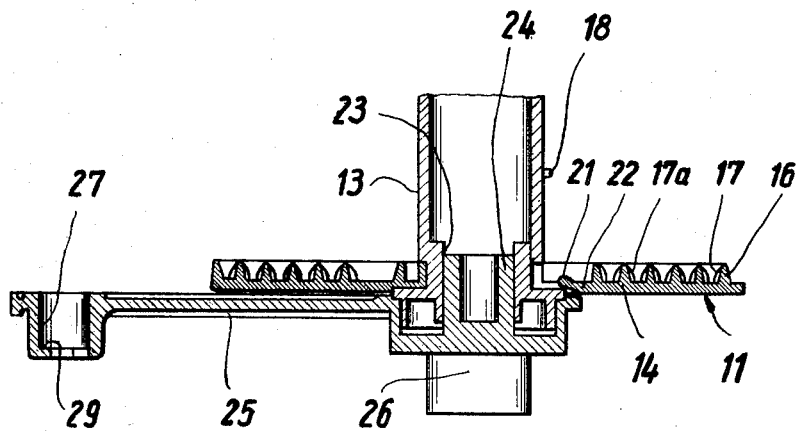
FIG. 7 is a section, corresponding to that of FIG. 3, through a modified developing spool. DESCRIPTION OF PREFERRED EMBODIMENTS As shown in FIGS. 1 to 3, the numerals 11 and 12 denote two spirally grooved discs, mounted on a spindle 13 and formed by spiral webs 15, interconnected by radial webs 14. Near the radial webs 14, studlike guide elements 17 project into the spiral grooves 16, these elements extending obliquely from the upper edge of the outer wall of each spiral groove to the floor of the groove and holding the film or a pair of films against the inner wall of the spiral grooves. The guide elements 17 precisely determine the position of the film in the spiral grooves without the need for sacrificing an adequately large cross section for the passage of the developer fluid. The width of the spiral grooves can be made at least equal to 1.5 times the width of the spiral webs.

Finally, FIG. 7 shows a cross section, corresponding to that of FIG. 3, through a developing spool which is provided with guide elements 17 and 17a on both walls of the spiral grooves 16. This arrangement is preferably used for cartridge and cassette films.

I claim:

1. A spool for carrying film comprising a spindle, at least two spirally grooved discs mounted on the spindle, at least one retaining mechanism for securing the ends of the film to the spindle, and an ancillary device having a lead-in channel for introducing the strips of film into the grooves on the spirally grooved discs, wherein the retaining mechanism comprises a flap which is resiliently lockable in an open or closed position and which in the open position, defines with the spindle a wedge-shaped gap for introducing the end of the film onto the spindle and in the vicinity of which flap there terminates said lead-in channel of the ancillary device, which channel guides the film beneath the flap and can be locked on to the spool.

2. A spool as claimed in claim 1, wherein at least one projection is used for locking the flap, the projection cooperating with the outer edge of the flap and being located on at least one free end of a radial web which functions as a resilient tongue.

3. A spool as claimed in claim 1, wherein the flap is mounted to swing on the spirally grooved discs.

4. A spool as claimed in claim 1, wherein at least one retaining pip is provided on the spindle for anchoring the film on the spindle, a recess being provided in the flap whereby the recess accommodates the pip in the closed position of the flap.

5. A spool as claimed in claim 1 wherein there is a bracket on the spool and the lead-in channel bears at one end remote from the flap against said bracket.

6. A spool as claimed in claim 5, wherein the bracket is in the form of a bellcrank lever that can be attached to the spindle of the spool and is rotatably mounted to said spindle.

7. A spool as claimed in claim 5, wherein the lead-in channel is pivotally mounted in the bracket by its end remote from the spindle, 8. A spool as claimed in claim 7, wherein the lead-in channel is coupled, in its working position, with the bracket by a locking element.

9. A spool as claimed in claim 8, wherein the locking element is in the form of an L-shaped lug on the lead-in passage, which lug can be inserted in an eccentric slot on the bracket and can be locked by being turned through more than 45°.

10. A spool as claimed in claim 1, wherein a payout plate is provided at the inlet end of the lead-in channel which contains a semicircular orifice and is disposed substantially at right angles to the longitudinal axis of the lead-in channel.

11. A spool as claimed in claim 10, wherein the lower side and the lateral edges of the lead-in channel form a guide lip projecting beyond the payout plate.

12. A spool as claimed in claim 1, wherein a bridge is provided at the inlet end of the lead-in channel said bridge and the lead-in channel forming a guide tunnel.

13. A spool as claimed in claim 1, wherein guide elements project into the spiral grooves which elements hold the strips of film, introduced into the spool, at a distance from one wall of the spiral grooves.

14. A spool as claimed in claim 1, wherein guide elements project into the spiral grooves which elements hold the strips of film, introduced into the spool, at a distance from both walls of the spiral grooves.

15. A spool as claimed in claim 14, wherein the guide elements take the form of inclined studs positioned near radial webs which studs extend obliquely substantially from the upper edge of the outer wall of the respective spiral grooves to the radial webs which define the floors of the grooves and interconnect the spiral webs at their rear.

16. A spool as claimed in claim 1, wherein the width of the spiral grooves is at least equal to 1.5 times the width of the spiral webs.